United States Patent [19]

Munehiro

[11] 4,318,038
[45] Mar. 2, 1982

[54] MOVING-COIL LINEAR MOTOR

[75] Inventor: Hidehiko Munehiro, Tokyo, Japan

[73] Assignee: Nippon Electric Co., Ltd., Tokyo, Japan

[21] Appl. No.: 93,556

[22] Filed: Nov. 13, 1979

[30] Foreign Application Priority Data

Nov. 15, 1978 [JP] Japan .................. 53-140653
Nov. 15, 1978 [JP] Japan .................. 53-140654
Feb. 2, 1979 [JP] Japan .................. 54-11221

[51] Int. Cl.³ .......................................... H02K 33/00
[52] U.S. Cl. .................................. 318/135; 310/13; 310/27
[58] Field of Search ......................... 310/12–19, 310/27; 318/135

[56] References Cited

U.S. PATENT DOCUMENTS

3,416,535 12/1968 Kalthoff et al. .................. 310/13 X
3,439,198 4/1969 Lee ..................................... 310/13
3,470,432 9/1969 Chubbuck ......................... 310/27 X
3,599,020 8/1971 Harris et al. ........................ 310/13
4,227,100 10/1980 Ezekiel et al. .................... 310/27 X Primary Examiner—Donovan F. Duggan
Attorney, Agent, or Firm—Sughrue, Mion, Zinn, Macpeak & Seas

[57] ABSTRACT

A moving-coil linear motor suitable for driving a printer carriage of a serial printer is provided with a pair of coils disposed in side-by-side relationship. Logic circuitry is utilized to select which of the two coils should be energized, and in which direction current should flow through the coil in response to signals from a pair of magnetic field sensors mounted on the moving coil assembly.

7 Claims, 17 Drawing Figures

| MAGNETIC FIELD SENSOR OUTPUT | | COIL SELECTION SIGNAL 17 |
|---|---|---|
| 16A | 16B | |
| 0 | 1 | 1 (COIL 7A) |
| 1 | 1 | 0 (COIL 7B) |
| 1 | 0 | 1 (COIL 7A) |
| 0 | 0 | 0 (COIL 7B) |

FIG. 8

| MAGNETIC FIELD SENSOR OUTPUT 16A | DIRECTION OF CARRIAGE MOVEMENT 19 | DIRECTION OF CURRENT FLOW 18 |
|---|---|---|
| 0 | 1 | 1 (FRONT→BACK) |
| 1 | 1 | 0 (BACK→FRONT) |
| 0 | 0 | 0 ( " ) |
| 1 | 0 | 1 (FRONT→BACK) |

MOVING-COIL LINEAR MOTOR

This invention relates to a moving-coil linear motor for moving an object to any desired position within a predetermined range and, more particularly, to a moving-coil linear motor suited for driving a printer carriage of a serial printer.

In a conventional printing machine, a print head mounted on a printer carriage is driven by a rotary motor through a cable connected to the carriage and wound around a pulley which has many grooves and is attached to the motor. Such a printing machine involves the problem of limited carriage positioning accuracy due to the elongation or contraction and the aging of the cable.

To solve this problem, a direct driving system has been proposed in which the printer carriage is driven by a linear motor. One example of conventional linear motors for positioning the printer carriage is described in the U.S. Pat. No. 3,899,699 entitled "BRUSHLESS LINEAR DC MOTOR ACTUATOR". It comprises a stator assembly including an elongated permanent bar magnet attached to one surface of another rod of ferromagnetic bar over the motor stroke and an elongated ferromagnetic rod positioned in parallel to and at a fixed distance from the permanent magnet; and a movable armature assembly including a coil so arranged around the ferromagnetic rod as to be able to achieve relative movement to the ferromagnetic rod, a core and a magnetic flux return path including the permanent magnet, the coil, the ferromagnetic rod and the permanent magnet.

In such a structure, the movable part constitutes a portion of the magnetic path and contains the ferromagnetic material. As a result, the movable part is inevitably massive. Furthermore, only a portion of the coil is brought into interaction with the magnetic flux of the permanent magnet, with the result that the force constant, i.e., the output drive force per input unit is small. To increase the density of the magnetic flux interlinking with the coil and thereby to enlarge the force constant, the cross section of the magnetic path had to be enlarged so that magnetic saturation might not occur on the path. Accordingly, the movable part had to be made proportionally massive.

On the other hand, U.S. Pat. No. 4,072,101 entitled "LINEAR ACTUATOR PRINTER CARRIAGE" describes another type of linear motor including no ferromagnetic substance in its movable part. It comprises a magnetic circuit including a center yoke having a uniform rectangular cross section over the motor stroke and being made of a ferromagnetic substance, three side yokes each having on one surface a piece of permanent magnet arranged opposite to one of three surfaces of the center yoke, an end yoke for fastening together the center yoke and side yokes at both ends thereof in the lengthwise direction, and for generating a uniform magnetic flux in an air gap between the surfaces of said permanent magnet pieces and the center yoke; and a coil disposed around the center yoke for moving in the air gap in a perpendicular direction to the magnetic flux.

In this structure, the magnetic flux returning to the permanent magnets concentrates on the two ends of the center yoke and the end yoke. Therefore, in order to let the magnetic flux flow without inviting magnetic saturation in these parts, the magnetic circuit had to be enlarged in its dimensions. If the circuit is desired to be compact, either the density of the magnetic flux in the air gap has to be decreased or the motor stroke shortened. In the prior art, therefore, it was difficult to realize a compact and light linear motor having a long stroke and a large force constant.

An objective of the present invention is to provide a compact and light moving-coil linear motor which has a relatively large force constant even where a long stroke is required.

In accordance with this invention, there is provided a moving-coil linear motor comprising: magnetic circuit means for providing at an air gap magnetic fields of polarities alternating at equal intervals; a moving coil assembly for moving in said air gap in a perpendicular direction to said magnetic fields, said moving coil assembly having two coils disposed side by side and being approximately half as wide as each of magnetic poles; and a logic circuit for selecting one of the two coils and for determining the direction of electric current caused to flow through said coils in response to magnetic field sensors mounted onto said moving coil assembly.

Other features and advantages of this invention will be apparent from the following description of preferred embodiments of this invention taken in conjunction with the accompanying drawings, wherein:

FIG. 1 is a plan view of a printing machine according to a first embodiment of this invention;

FIG. 2 is a plan view of a linear motor employed in the first embodiment;

FIG. 3 is a cross-sectional view along the line X—X' in FIG. 1;

Referring to FIG. 1, the printing machine comprises a frame 101, a printing head assembly 102 mounted on a carriage assembly 10 sliding on guide rails 104 and 105, a platen 103 driven by a knob 107 or a paper feed motor 106 through gear train 108, and a linear motor 109 for achieving a linear movement of the carriage assembly 10.

Referring to FIGS. 2 and 3, the moving-coil linear motor 109 comprises a plurality of permanent magnet slabs 1A and 1B magnetized in the direction of thickness and so arranged in the lengthwise direction, as illustrated, that the direction of magnetization alternates from one piece to another, two sets of flat yokes 2 parallel to each other, holding the permanent magnet slabs 1A and 1B glued or otherwise attached to one face thereof, a flat center yoke 3 so arranged as to face said permanent magnet slabs 1A and 1B, side yokes 4 fastening the flat yokes 2 and the center yoke 3 at its two ends. The permanent magnet slabs 1A and 1B, the flat yokes 2, the center yoke 3 and the side yokes 4 constitute a magnetic circuit M for generating a magnetic flux of uniform density at air gaps 5 between the permanent magnet slabs 1A and 1B and the center yoke 3.

The linear motor 109 further comprises a moving coil assembly 8 including two coils 7A and 7B on one coil bobbin 6, each coil being approximately half as wide as each of the permanent magnet slabs 1A and 1B, and being capable of moving in the air gaps 5 in a perpendicular direction to the magnetic flux, and magnetic field sensors 15A and 15B positioned between the mutually adjoining coils 7A and 7B and at a side end of the coil 7A (or 7B) apart from each other by a distance slightly greater than half the width of each of said permanent magnet slabs 1A and 1B. The carriage assembly 10 is coupled to the moving coil assembly 8, and slides on the guide rails 104 and 105 with the aid of guide rollers 9, as shown in FIG. 3.

Figure 4:
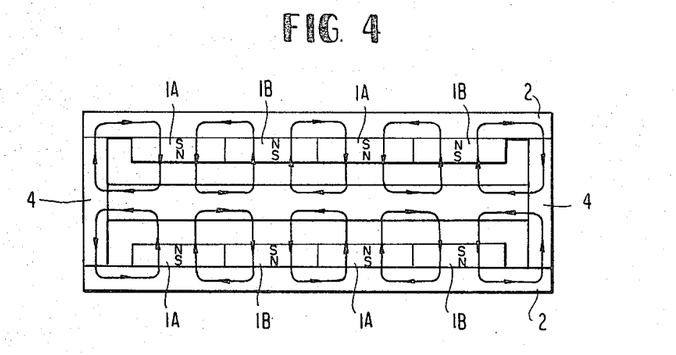
FIGS. 4 and 5 illustrate the operation of the linear motor according to the first embodiment as compared with that of a conventional linear motor.
Figure 5:
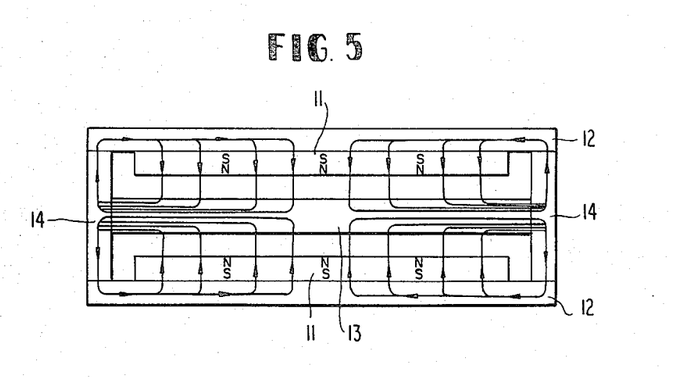

To illustrate characteristic features of the present invention, the flow of the magnetic flux in the magnetic circuit M is compared with that in a conventional linear motor, with reference to FIGS. 4 and 5. In FIG. 4 is illustrated the flow of the magnetic flux in the magnetic circuit M of the linear motor 109 of FIG. 1. FIG. 5 shows the flux flow in the magnetic circuit of the prior art as described in the above mentioned U.S. Pat. No. 4,072,101. In FIG. 5, reference numeral 11 stands for permanent magnets, 12 for yokes, 13 for a center yoke and 14 for side yokes.

In contrast to the magnetic circuit M wherein a plurality of closed loops are formed in the air gaps 5 and the magnetic flux concentrates on no particular part, the conventional circuit illustrated in FIG. 5 is so structured that the magnetic flux concentrates on both ends of the center yoke 13 and the side yokes 14. Therefore, if the two magnetic circuits are constructed in equal dimensions, the magnetic flux density in the air gap will be much less in the conventional circuit than in the circuit of the present invention because losses in magnetomotive force due to magnetic saturation will occur at the two ends of the center yoke 13 and the side yokes 14 where the magnetic flux is concentrated. Conversely, to obtain the same magnetic flux density in the air gap, the conventional structure will require a center yoke 13 and side yokes 14 of greater dimensions to prevent magnetic saturation on the magnetic path, and the magnetic circuit accordingly will have to be much larger and much more massive than that of this invention.

Furthermore, the magnetic circuit M permits the motor stroke to be infinitely extended resulting only in a corresponding increase in motor length in the direction of its stroke but without affecting the functional factors of the motor including other dimensions and magnetic flux density in the air gap, while in the conventional magnetic circuit a greater stroke would mean greater magnetic saturation at both ends of the center yoke and consequently a lower magnetic flux density in the air gap and a smaller force constant of the motor, which accordingly limits the practically usable stroke.

FIG. 6 illustrates how the moving coil linear motor 109 is driven. The description hereunder applies to an instance where the motor 109 is so driven that the moving-coil assembly 8 is subjected to force working towards the right. While the moving-coil assembly 8 is being shifted over a distance equal to half the width of each of the permanent magnet slabs 1A and 1B from the position indicated in FIG. 6(A) to that in FIG. 6(B), the electric current is caused to flow through the coil 7A from the front to the back side of the paper in conformity with Fleming's lefthand rule. Next, while it is being shifted from the position in FIG. 6(B) to that in FIG. 6(C), the current is caused to flow through the coil 7B from the back to the front side of the paper.

Figure 6A:
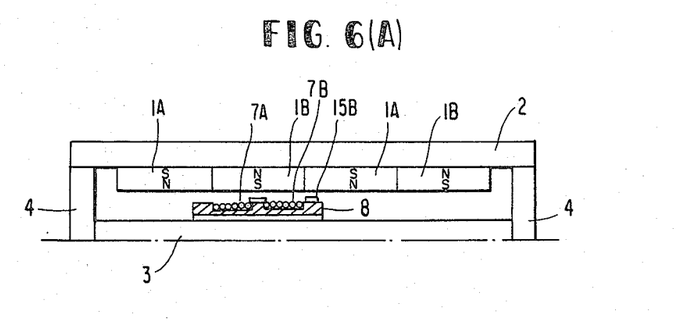
FIGS. 6(A) to 6(D) illustrate the principle of the linear motor.
Figure 6B:
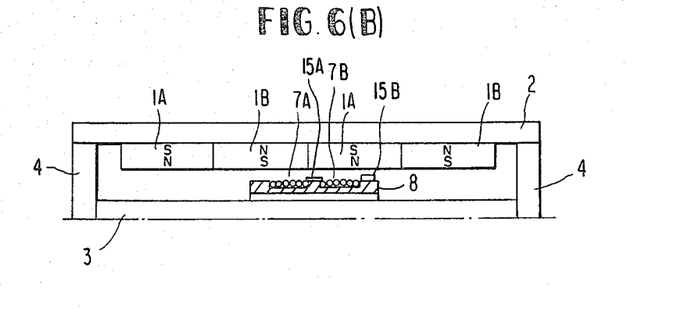
Figure 6C:
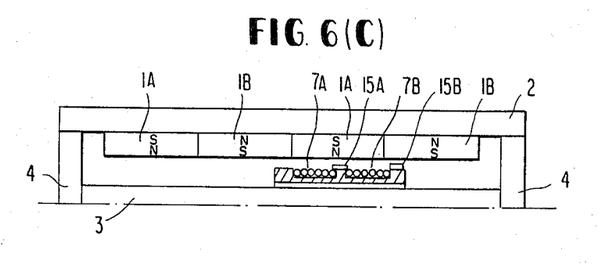
Figure 6D:
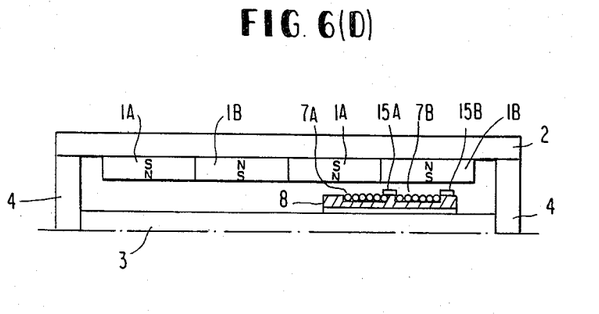

Then, during the shift from the position in FIG. 6(C) to that in FIG. 6(D), the current is caused to flow through the coil 7A from the back to the front side of the paper, and during the shift from the position in FIG. 6(D) by a distance equal to half the width of a permanent magnet slab 1B, the current is caused to flow through the coil 7B from the front to the back side of the paper. This sequence is repeated in subsequent strokes.

Thus, the direction of the electric current should be so determined that the coil 7B interposed between the magnetic field sensors 15A and 15B is selected when the sensors 15A and 15B are in contact with one face of the same permanent magnet slab, and the coil 7A is selected when they are in contact with different permanent magnet slabs, subjecting the moving-coil assembly 8 to a force working towards the right. When the moving coil assembly 8 is subjected to a force working towards the left, the direction of the current to flow through the coil should be determined by similarly selecting the appropriate coil in accordance with Fleming's lefthand law.

Figure 7:
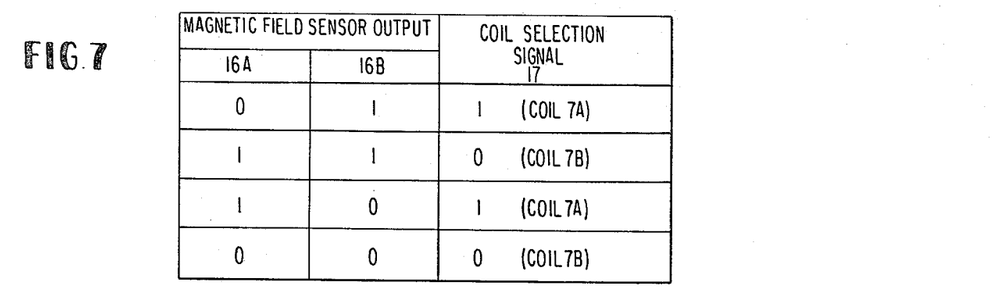
FIGS. 7 and 8 are tables showing logical level of the coil selection signal and the flow direction of current, respectively.

FIG. 7 is a table showing the relationship between detected signals 16A and 16B from the sensors 15A and 15B, and a coil selection signal 17. When the coil selection signal 17 is logical '1' and '0', the current is applied to the coils 7A and 7B, respectively. The detected signals 16A and 16B are represented by a logical "1" when the face of the permanent magnet piece exposed to the air gap 5 has an N pole like that of 1A, and by logical "0" when it has an S pole like that of 1B. This arrangement can be readily realized by the use of a commercially available IC, for instance Model DN6838 marketed by Matsushita Electronic Industries.

Figure 8:
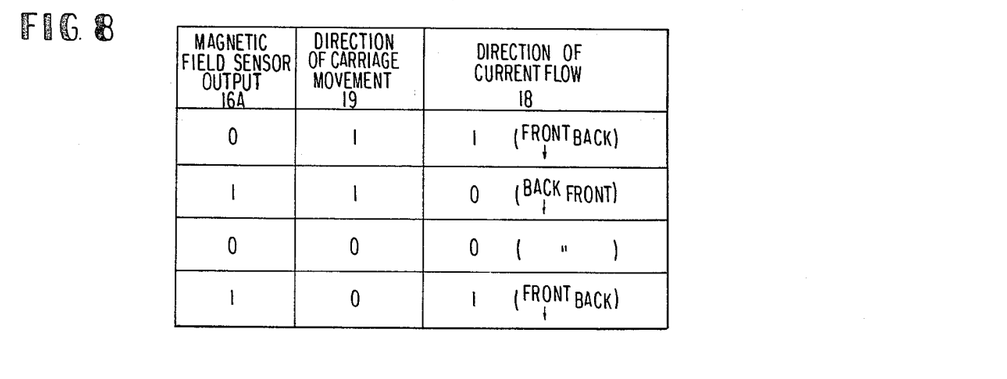

FIG. 8 is a table showing a signal 18 indicating the direction of the current flow through the coil 7A or 7B. The direction of the current flowing through the coil 7A or 7B from the front to the back side of the paper is defined as "1" and the reverse direction as "0". A driving direction signal 19 is supposed to be logical "1" when the moving coil assembly 8 is subjected to force working towards the right and logical "0" when the direction is opposite. Both the choice between the coils 7A and 7B, and the direction of the current to flow through the coils, can be achieved by exclusive OR gates.

In the linear motor 109, the magnetic field sensor 15A is positioned between the coils 7A and 7B of the moving coil assembly 8, and another magnetic field sensor 15B is located at a side end of the coil 7B (or 7A). The coil through which the current should flow is selected by the exlusive-OR operation on the detected signals 16A and 16B, and the direction of the current to flow through the coil so selected is determined by the exclusive-OR operation on the detected signal 16A and the driving direction signal 19, which designates the direction in which the moving coil assembly 8 should be driven.

Figure 9:
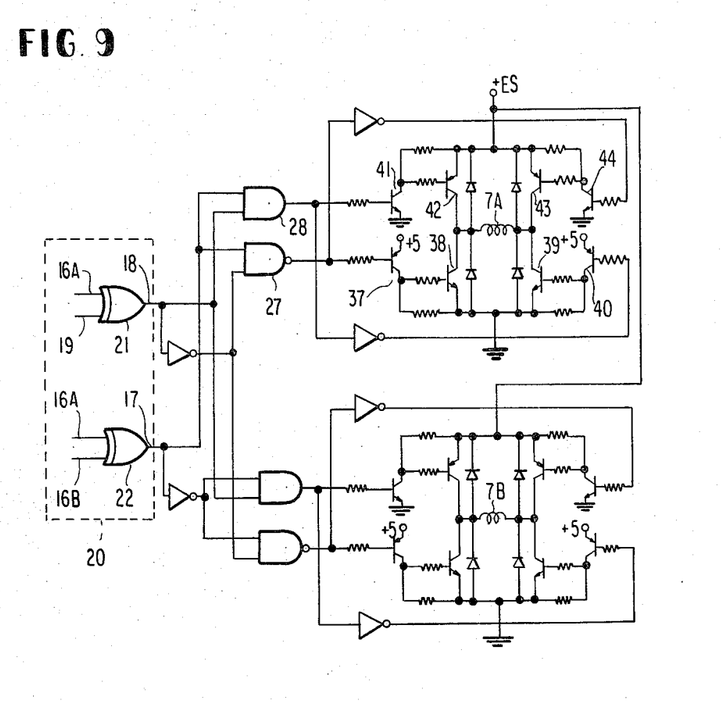
FIGS. 9 and 10 are circuit diagrams of the linear motor driving circuit shown in FIG. 2.
Figure 10:
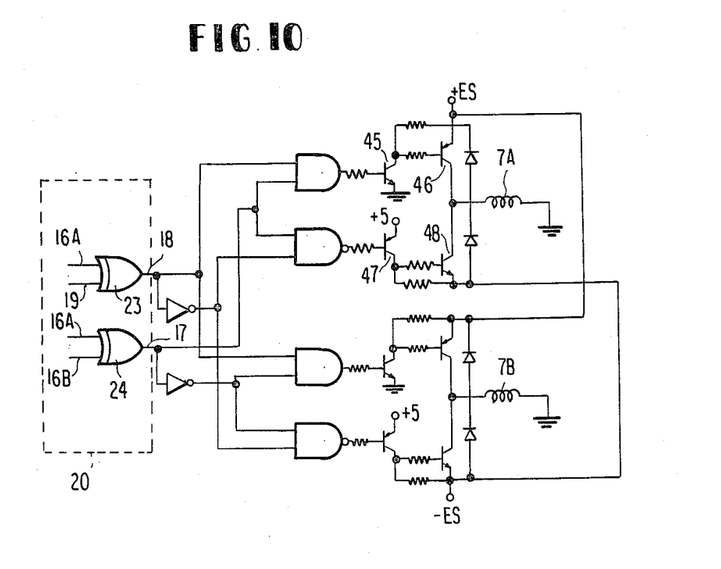

FIGS. 9 and 10 show two examples of driving circuits which can be used for driving the linear motor 109 from a given position in a given direction. FIG. 9 shows a first example in which one power supply unit is used, and FIG. 10, a second example in which two power supply units are used. The parts surrounded by dotted lines in FIGS. 9 and 10 are the logical circuits which select the coil and determine the direction of the current to be caused to flow through the coil.

In FIG. 9, assuming that the signal 16A is to be "0", 16B to be "1" and 19 to be "1", both the output 17 of a gate 22 and the output 18 of a gate 21 will be "1" thereby turning on only transistors 41, 42, 39 and 40 by way of gates 27 and 28 and an inverter 29, and the current will flow through the coil 7A from left to right.

If, in this arrangement, the signal 19 alone is turned to "0", transistors 37, 38, 43 and 44 are turned on, causing the current to flow through the coil 7A from right to left. In other cases, the coil selection and current direction are similarly controlled.

In FIG. 10, assuming that the signal is to be "0", 16B is "1" and is "1", transistors 45 and 46 alone are turned on causing the current to flow through the coil 7A from left to right. If the signal 19 alone is turned to "0", only transistors 47 and 48 are turned on, causing the current to flow through coil 7A from right to left. In other cases, the coil selection and current direction are similarly controlled.

Figure 11:
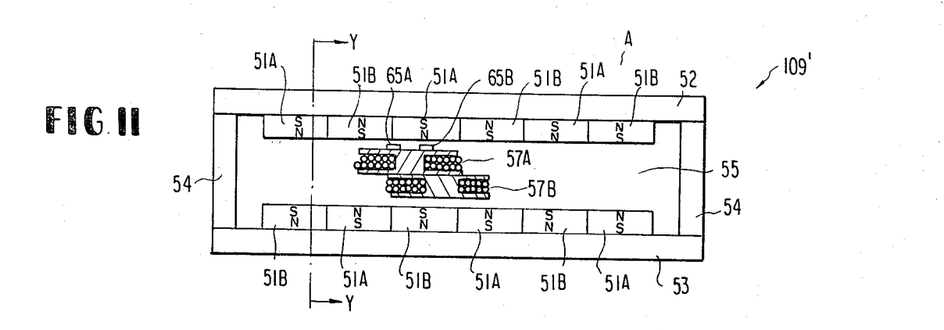
FIGS. 11 and 12 are plan and cross-sectional views of a second embodiment of the invention.
Figure 12:
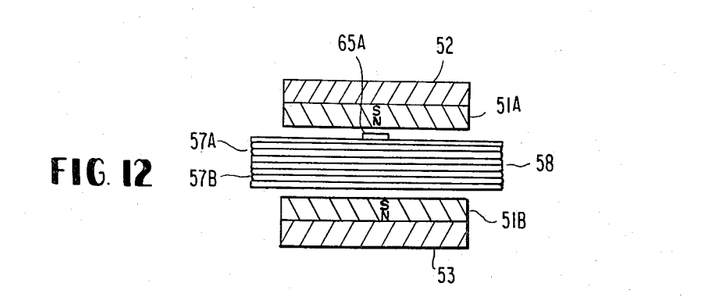

FIGS. 11 and 12 illustrate a second embodiment 109' of this invention. It comprises a magnetic circuit A including a plurality of permanent magnet slabs 51A and 51B magnetized in the direction of thickness and so arranged (in the lengthwise direction as illustrated) that the direction of magnetization alternated from one slab to next, slim and long slab-shaped yokes 52 and 53 holding the permanent magnet slabs 51A and 51B glued or otherwise attached to one face thereof, and side yokes 54 so fastening the yokes 52 and 53 at both ends thereof so that the end faces of the permanent magnet slabs 51A and 51B confront each other, and for generating a magnetic flux of uniform density in an air gap 55 between the permanent magnet slabs 51A and 51B confronting each other; a moving coil assembly 58 including flat coils 57A and 57B, each as thick as approximately half the width of each of said permanent magnet slabs 51A and 51B, wound round spools 56 (FIG. 13) as thick as approximately half the width of each of said permanent magnet slabs 51A and 51B and overlapping each other with a lag equal to half the width of each of said permanent magnet slabs 51A and 51B, and for moving in the air gap 55 in a perpendicular direction to the magnetic flux; and magnetic field sensors 65A and 65B, one positioned on the inner or outer periphery of the coil and on a line passing the center of the spool and parallel to the moving direction of the coil assembly and the other apart therefrom by a distance equal to an odd multiple of half the width of each of said permanent magnet slabs 51A and 51B.

Figure 13:
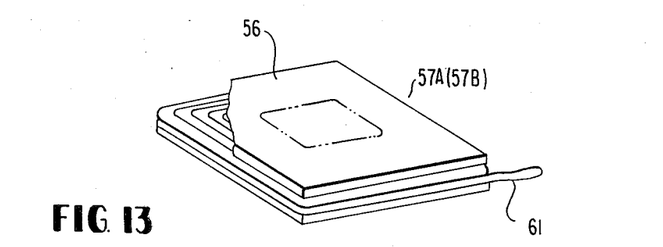
FIG. 13 is a perspective view of the moving coil assembly employed in the second embodiment.

The coils 57A and 57B shown in FIG. 13 are so combined as to overlap each other and constitute the moving coil assembly 58. Exactly the same function can be achieved if an integrated spool is used for the moving coil assembly 58.

Figure 14:
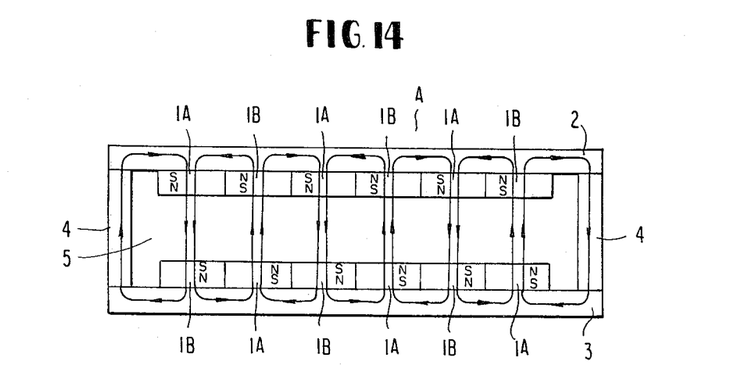
FIG. 14 illustrates the operation of the second embodiment.

FIG. 14 shows the flow of the magnetic flux in the magnetic circuit of the second embodiment. Like in the first embodiment, a plurality of closed loops are formed, but the magnetic flux concentrates on no particular part of the magnetic path.

As hitherto described, the linear motor is driven, according to the present invention, by detecting the position and moving direction of the moving coil assembly and controlling the current to be supplied to the two coils thereof. That is to say, the current is caused to flow through only that coil which is in a magnetic flux of uniform density during its movement, enabling the moving coil assembly to be subjected to constant driving force throughout each stroke. Because the moving-coil linear motor of this invention has two coils adapted to be energized one at a time, and the current is therefore equally shared between the two coils on an average, it consumes only half the electric power per coil of the conventional single-coil structure. Accordingly, the temperature rise in the coils is less, resulting in a reduced danger of the coils being burnt even in more frequent use.

Further, the same effect can obviously be achieved if the signals obtained from the magnetic field sensors are recorded on an externally installed position scale and are used as control signals for the coil selection and the direction of the current to be impressed on the coils.

The present invention has thus made it possible to realize a compact, light, simple-structured and low-cost linear motor having a relatively large force constant for any motor stroke and generating constant driving force over its full stroke.

What is claimed is:

1. A moving-coil linear motor, comprising:
    a magnetic circuit means for providing a plurality of magnetic fields at an air gap, wherein said magnetic fields alternate in polarity at equal intervals along the length of the magnetic circuit;
    a moving coil assembly for moving within said air gap in a direction perpendicular to said magnetic fields, said moving coil assembly having two coils disposed in side-by-side relationship and isolated from each other, each coil being approximately half as wide as each of the magnetic poles; and
    a logic circuit for selecting one of the two coils for energization and for determining the direction of the electric current caused to flow through said coils in response to a magnetic field sensor means mounted on said moving coil assembly.

2. A moving-coil linear motor as claimed in claim 1, wherein said magnetic circuit means comprises:
    first yokes having a plurality of permanent magnet slabs of equal dimensions attached thereto, said slabs being magnetized in the direction of their thickness and being arranged on one face of each yoke in the lengthwise direction thereof such that the direction of magnetization alternates from one slab to the next;
    a center yoke between said first yokes and arranged as to face said permanent magnet slabs; and
    said yokes for holding said first yokes and said center yoke.

3. A moving-coil linear motor as claimed in claim 2, wherein said magnetic circuit means provides a magnetic flux of uniform density in said air gap, said air gap being located between said slabs and said center yoke.

4. A moving-coil linear motor as claimed in claim 3, wherein said moving coil assembly includes two coils, each of which is approximately half as wide as each of said slabs, said coils being arranged on a single coil bobbin.

5. A moving-coil linear motor, comprising:
    a magnetic circuit including a plurality of permanent magnet slabs magnetized in the direction of their thicknesses, said slabs being arranged in a lengthwise manner such that the direction of magnetization of the slabs alternates from one slab to the next,
    a moving coil assembly comprising a pair of flat coils, each coil having a thickness approximately equal to one-half the width of a slab, said coils overlapping one another with a lag approximately equal to one half the width of a slab, said moving coil assembly being arranged for movement within an air gap in a direction perpendicular to the magnetic flux; and a logic circuit for selecting one of the two coils for energization and for determining the direction of the electric current caused to flow through said coils in response to a magnetic field sensor means mounted on said moving coil assembly.

6. A moving-coil linear motor as claimed in claim 3 or claim 5, wherein said magnetic field sensor means comprises first and second sensors, said first and second sensors being positioned on said moving coil assembly, and said second sensor being spaced from said first sensor by a distance equal to an odd multiple of one-half of the width of a slab.

7. A moving coil linear motor as claimed in claim 5, wherein said magnetic circuit further comprises a pair of first yoke members for holding said slabs attached to one face thereof, and said yoke members for holding said first yoke members at both ends thereof such that the end faces of each of two rows of said slabs are in confronting relation.

* * * * *

UNITED STATES PATENT AND TRADEMARK OFFICE
CERTIFICATE OF CORRECTION

PATENT NO. : 4,318,038
DATED : March 2, 1982
INVENTOR(S) : Hidehiko MUNEHIRO

It is certified that error appears in the above—identified patent and that said Letters Patent is hereby corrected as shown below:

Column 2, line 38, delete "level" and insert -- levels -- .

Column 5, line 15, after "and" insert -- 19 -- .

Column 7, line 10, delete "3" and insert -- 1 -- .

Column 8, line 8, delete "said" and insert -- side -- .

Signed and Sealed this

Eighth Day of June 1982

[SEAL]

Attest:

GERALD J. MOSSINGHOFF

Attesting Officer

Commissioner of Patents and Trademarks